United States Patent
Bostick et al.

(10) Patent No.: US 10,298,334 B2
(45) Date of Patent: May 21, 2019

(54) SIGNAL STRENGTH BOOSTING IN HUMAN-BODY NEAR-FIELD COMMUNICATION SYSTEM

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/437,536

(22) Filed: Feb. 21, 2017

(65) Prior Publication Data
US 2018/0241482 A1 Aug. 23, 2018

(51) Int. Cl.
| | | |
|---|---|---|
| *H04B 13/00* | (2006.01) | |
| *H04L 29/08* | (2006.01) | |
| *H04B 17/318* | (2015.01) | |
| *H04W 4/80* | (2018.01) | |

(52) U.S. Cl.
CPC ......... *H04B 13/005* (2013.01); *H04B 17/318* (2015.01); *H04L 67/34* (2013.01); *H04W 4/80* (2018.02); *H04L 67/306* (2013.01)

(58) Field of Classification Search
None
See application file for complete search history.

(56) References Cited

U.S. PATENT DOCUMENTS

| | | | |
|---|---|---|---|
| 8,961,412 B2* | 2/2015 | Hafezi ............... | A61B 5/073 128/902 |
| 2013/0149965 A1* | 6/2013 | Gilad-Bachrach ....... | H04B 5/00 455/41.2 |
| 2015/0126834 A1 | 5/2015 | Wang et al. | |

(Continued)

OTHER PUBLICATIONS

Marc Simon Wegmuller, Intra-Body Communication for Biomedical Sensor Networks, 2007.*

(Continued)

*Primary Examiner* — Mohammed Rachedine
(74) *Attorney, Agent, or Firm* — Cantor Colburn LLP; Brian Restauro

(57) ABSTRACT

Embodiments include a technique for a signal strength boosting in a human-body near-field communication systems, the technique includes receiving a configuration of a set of devices disposed on a body of a user for transmitting a signal across the body of the user, the devices being configured to amplify the signal, and receiving an indication of a signal strength of the signal transmitted through the devices of the set of devices. The technique also includes identifying a location of signal loss based on the signal strength, and providing a recommendation to modify the configuration of the set of devices based on the identified location of signal loss, wherein the recommendation provides a location for placement of one or more additional devices to increase the signal strength. The technique includes updating the configuration based on the one or more additional devices.

19 Claims, 5 Drawing Sheets

100

(56) References Cited

U.S. PATENT DOCUMENTS

2016/0302721 A1    10/2016  Wiedenhoefer et al.
2016/0338644 A1*   11/2016  Connor .................. G06F 3/014

OTHER PUBLICATIONS

Marc Simon Wegmuller, Intra-Body Communication for Biomedical Sensor Networks, 2007 (Year: 2007).*
The Energy Harvesting Network, "Energy Harvesting From Human Power", EPSRC, Mar. 2011, 20 pages.

* cited by examiner

SIGNAL STRENGTH BOOSTING IN HUMAN-BODY NEAR-FIELD COMMUNICATION SYSTEM

BACKGROUND

The present invention relates to wireless communication systems, and more specifically, to signal strength boosting in a human-body near-field communication system.

Near-field wireless communication technologies include a set of short-range technologies such as Transfer Jet, Near-Field Communication, UWB, etc. These technologies have different characteristics with respect to different speeds, bandwidths, and communication ranges and can be used based on the various requirements of the applications. A wireless personal area network (WPAN) is a low-powered PAN carried over a short-distance wireless network technology, including body area networks, a wireless network of wearable network devices. Devices that are capable of communication over the WPAN include PCs, PDAs, tablets, peripherals, cell phones, pagers and consumer electronics. Body area networks (BAN), also referred to as a wireless body area network or body sensor network (BSN), is a wireless network of wearable computing devices. Wearable computing devices include smart watches, wireless headphones, various fitness monitors, and the like. Body area networks can be integrated with human-body near-field communication systems for transmitting data.

SUMMARY

According to one embodiment, a method for signal strength boosting in a human-body near-field communication system is provided. The method includes receiving a configuration of a set of devices disposed on a body of a user for transmitting a signal across the body of the user, the devices being configured to amplify the signal, and receiving an indication of a signal strength of the signal transmitted through the devices of the set of devices. The method also includes identifying a location of signal loss based on the signal strength and providing a recommendation to modify the configuration of the set of devices based on the identified location of signal loss, wherein the recommendation provides a location for placement of one or more additional devices to increase the signal strength. The method includes updating the configuration based on the one or more additional devices.

According to another embodiment, a system for signal strength boosting in a human-body near-field communication system is provided. The system including a storage medium, the storage medium being coupled to a processor, the processor configured to receive a configuration of a set of devices disposed on a body of a user for transmitting a signal across the body of the user, the devices being configured to amplify the signal. The processor is also configured to receive an indication of signal strength of the signal transmitted through the devices of the set of devices, and identify a location of signal loss based on the signal strength. The processor is configured to provide a recommendation to modify the configuration of the set of devices based on the identified location of signal loss, wherein the recommendation provides a location for placement of one or more additional devices to increase the signal strength and updating the configuration based on the one or more additional devices.

According to a different embodiment, a computer program product for signal strength boosting in human-body near-field communication systems. The computer program product includes a computer readable storage medium having stored thereon first program instructions executable by a processor to cause the processor to receive a configuration of a set of devices disposed on a body of a user for transmitting a signal across the body of the user, the devices being configured to amplify the signal, and receive an indication of a signal strength of the signal transmitted through the devices of the set of devices. The instructions are further executable by the processor to cause the processor to identify a location of signal loss based on the signal strength, and provide a recommendation to modify the configuration of the set of devices based on the identified location of signal loss, wherein the recommendation provides a location for placement of one or more additional devices to increase the signal strength. The instructions are further executable by the processor to cause the processor to update the configuration based on the one or more additional devices.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
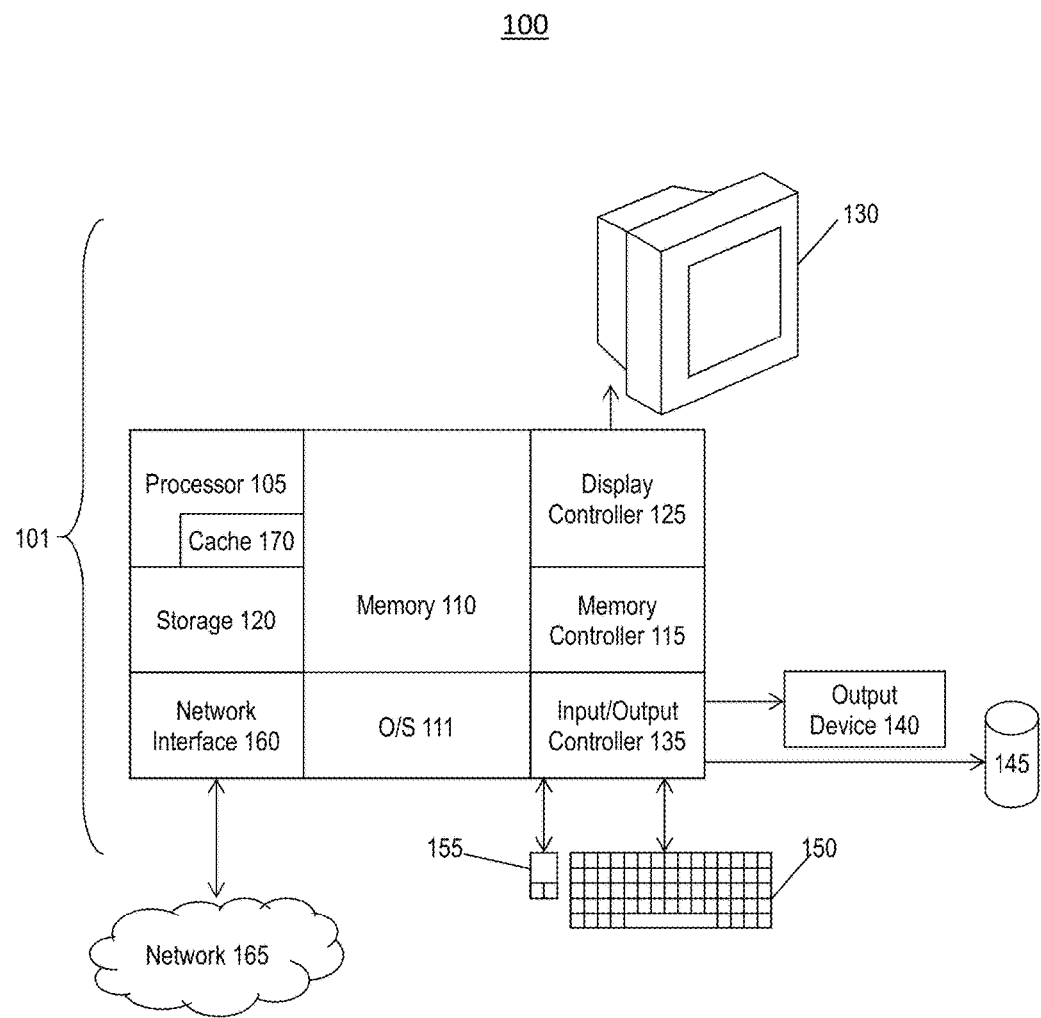
FIG. 1 is a block diagram illustrating one example of a processing system for practice of the teachings herein.

In accordance with exemplary embodiments of the disclosure, methods, systems and computer program products for signal strength boosting in a human-body near-field communication system.

Body area networks implement communications on, near, and/or around the human body. The body area networks can be integrated with wearable technology such as devices and sensors to communicate through the field of the body where the devices interface with the body's electric field using electrodes. The transmitting devices are capable of modulating the body area electric field while the receiving devices' electrode demodulates the electric field. The electrodes are capable of reading the electric fields generated by the human body. These devices and sensors are capable of being disposed on or implanted in the body. Electronic-tattoos (e-tattoos) are examples of these devices that can be adhered to a user's skin. These devices are capable of communicating with other devices in the body area network and are also capable of communicating with the Internet and networks coupled to the body area network. The e-tattoos are capable of amplifying a received signal and retransmitting the signal over the body area network.

Applications that use body area networks include medical applications, sports training applications, etc. Body area networks allow for the continuous monitoring of user's physiological conditions. Body area networks can be used in medical applications for monitoring patient's condition. Body area networks can also be used in sports applications for monitoring athletes and clients. For example, a cyclist may require more sensors/devices in his lower body regions and legs as opposed to his upper body and arms to monitor his performance. In another example, a tennis player or cross-fit athlete may require a more even distribution of probes when compared to the cyclist.

Systems transmitting signals can become faced with signal and path loss due to interference from other signals/devices and integrity of the transmission medium. The path loss throughout the human body can vary depending on different body types. Weak electric fields can be propagated over the body surface and can be leveraged to transmit signals. The human body can be used as a transmission medium for electrical signals. However, due to transmission loss, the signals can become very weak and unusable. A technique for signal boosting to prevent potentially damaging signal loss is described herein. Using transmitters, receivers, and devices such as e-tattoos, the human body can transmit signals and thus transmit data over communication paths of the body.

Instead of receiving energizing signals from a personal area network associated with the mobile communication device (MCD), an e-tattoo and associated piezoelectric strips generate power through the piezoelectric strips that are positioned at the joints of a user. A piezoelectric sensor is a device that uses the piezoelectric effect to measure changes in pressure, acceleration, temperature, strain, or force by converting them to an electrical charge. The power required to amplify the received signals at the devices is generated locally (on the body) using the piezoelectric strips. The piezoelectric strips can be positioned on the body to be activated by natural movements such as walking or some other method of compressing the piezoelectric strip. An action of the user can be used to generate the energy such as pedaling by a cyclist or the bending joints of a runner. The placement of the piezoelectric strips can be positioned to not inconvenience the user or require the user to do unnatural movements.

The signal power loss in body area networks is addressed by the techniques described herein. The signals transmitted over the body area network can be boosted by the use of e-tattoos where the e-tattoos do not require an external power source to boost the signal. The power is generated by piezoelectric strips that are activated and coupled to the e-tattoos that are receiving the signal. In another embodiment, the positioning of the e-tattoos can be determined to optimize the signal strength realized by the target receiving device.

In an exemplary embodiment, in terms of hardware architecture, as shown in FIG. 1, the computer 101 includes a processor 105. The computer 101 further includes memory 110 coupled to a memory controller 115, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in storage 120, such as cache storage, or memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. The instructions in the memory 110 a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or another similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. Other networks include body area networks (BAN) where the electric field of a human body can be used to transmit signals.

If the computer 101 is a PC, workstation, intelligent device or the like, the instructions in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to fetch and execute instructions stored within the memory 110, to communicate data to and from the memory 110, and to generally control operations of the computer 101 pursuant to the instructions.

Figure 4:
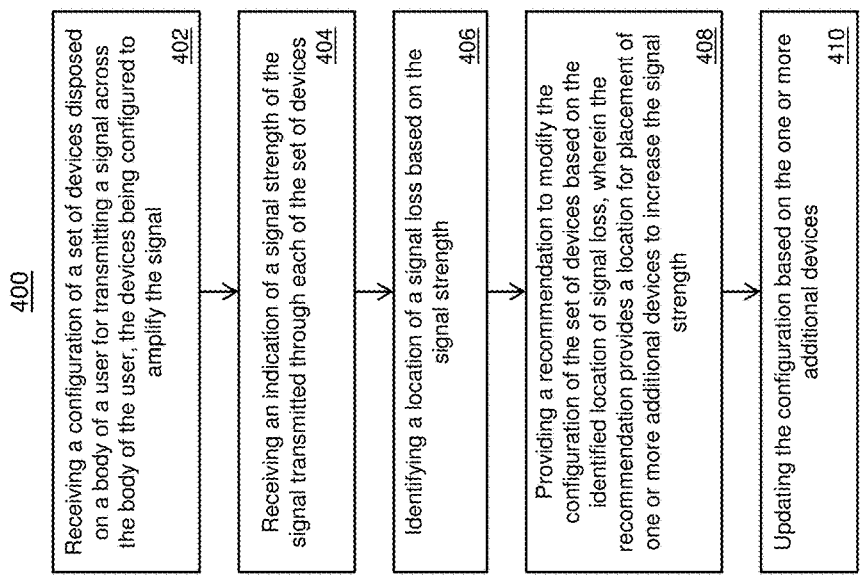
FIG. 4 is a flow diagram illustrating a method for signal strength boosting in a human-body near-field communication system.
Figure 5:
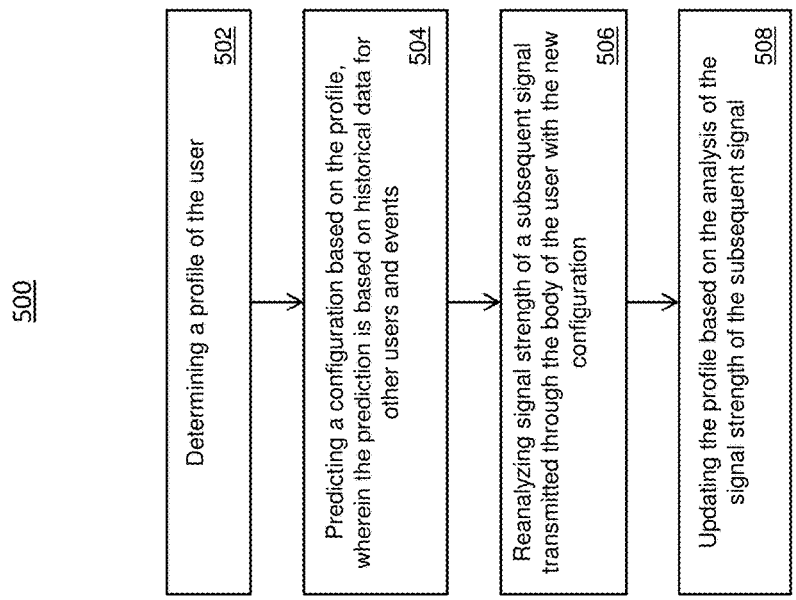
FIG. 5 is a flow diagram illustrating another method for signal strength boosting in a human-body near-field communication system.

In an exemplary embodiment, where the utilizing biometric emotion change for photography capture is implemented in hardware, the methods described herein, such as processes 400 and 500 of FIGS. 4 and 5, respectively, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
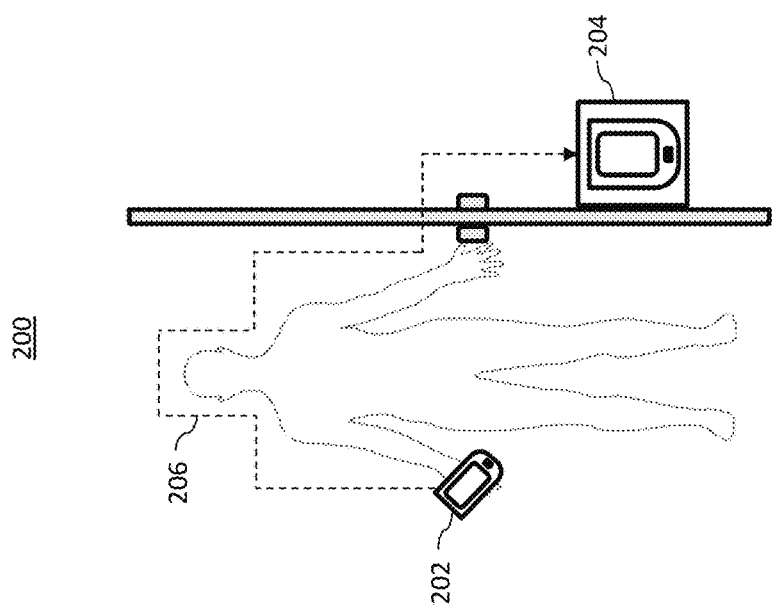
FIG. 2 is a diagram illustrating another example of a system for signal strength boosting in a human-body near-field communication system.

Now referring to FIG. 2, a diagram for a human-body near-field communication system 200 is shown. Device 202 transmits a signal to a receiving device 204 through a path 206 of the body area network of a user. The human-body is capable of maintaining a weak electric field that can be leveraged to transmit a signal to a receiving device. In one or more embodiments, device 202 utilizes high-efficiency electric-field induction technology to interface with the body area network of the user using an electrode coupled to the user. Device 204 includes environmental suppression technology to receive and filter the signal from the body area network. The device 204 processes the signal received from the body area network to allow the user to gain access. In one or more embodiments, device 204 can be configured with an electrode to receive the signal from the body area network.

In an example, the human-body near-field communication can be used for secured area access. FIG. 2 provides an example of a secured access application using the human-body near-field communication system as opposed to using a physical smartcard or physical key for access. A device 202 comprising the credentials for access is used to transmit a signal to a device 204 which is coupled to a locking mechanism of the door. As a user making contact with device 202, the device 202 transmits the signal including the credentials to unlock the door through a communication path 206 over the user's body. In this example, the user is not required to bring the device 202 within close proximity to the device 204 as the signal is transmitted over the communication path 206.

Figure 3:
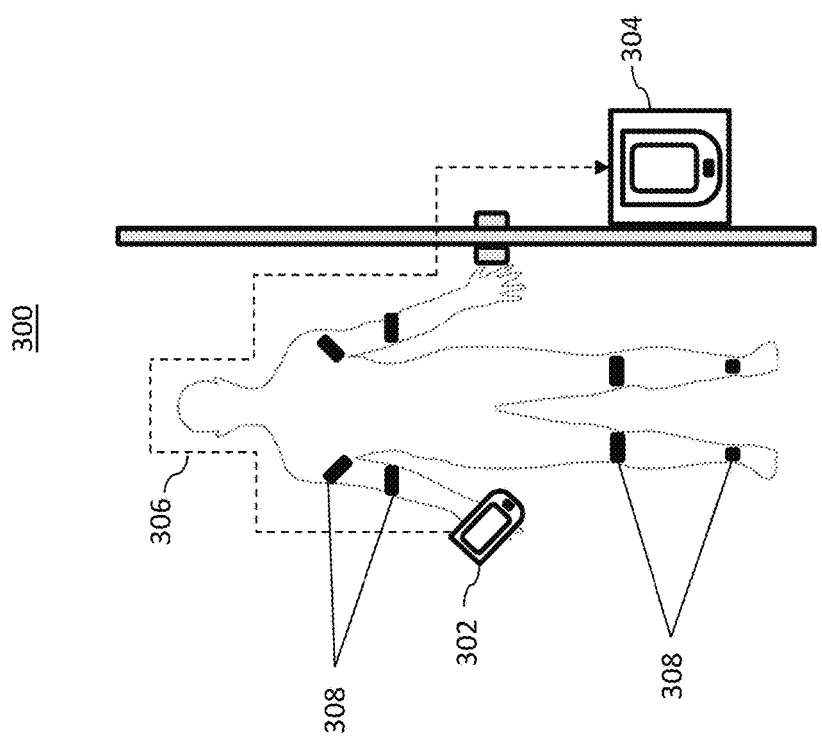
FIG. 3 is a diagram illustrating a different example for signal strength boosting in a human-body near-field communication system.

Referring now to FIG. 3, a diagram for signal strength boosting in a human-body near-field communication system 300 is shown. Device 302 transmits a signal to device 304 through path 306 of the body area network. As the signal travels through and/or across the human body area network the signal may experience signal loss or interference which weakens the signal. Devices 308 are disposed and positioned on a user's body to amplify and transmit a received signal. In one or more embodiments, devices 308 include e-tattoos, hereinafter referred as e-tattoos. The e-tattoos are a type of device similar to flexible silicon stickers connected by accordion-like structures that are capable of moving with a person's body. In addition, the e-tattoos can remain adhered to the skin during movement and can be applied to the body as needed. Different applications can require different positioning of the e-tattoos. For example, a doctor may want to apply the e-tattoos in a safe and strategic location so the loss of signals is not problematic while trying to retrieve sensor data during an operation. The e-tattoo based body transmitted signal booster is configured to increase the signal so that it appears stronger at the receiving end. The e-tattoo based signal booster receives weak signals and amplifies the strong signal such that the receiving target device is capable of processing the signal properly. In one or more embodiments weak signals can be determined based on user-defined and/or device-defined thresholds.

FIG. 3 provides an example utilizing a secured access application similar to that shown in FIG. 2. In this example, devices 308 (e-tattoos including amplifying circuits coupled to piezoelectric strips) are positioned at various locations on the user's body to increase the signal strength of the signal being transmitted over the communication path 306. Depending on the user's body type, the signal strength over the body area network can be affected by several factors including the user's body type and event type. Therefore the placement of the devices 308 can change according to the application. Feedback from the target device 304 can be provided to a computing system, where the computing system analyzes the received signal to determine a point of signal loss over the body. The computing system can recommend a configuration to increase the signal strength based on the identified points of signal loss or deterioration. In one or more embodiments, the signal loss can be based on a configurable threshold. In another embodiment, the signal loss can be based on a difference between the signal strength of an initially measured signal strength in the communication path 306 and a current signal strength.

The e-tattoos include amplifying circuits for amplifying a received signal and re-transmitting the signal through the body area network towards the destination device or the next e-tattoo. The e-tattoos are also coupled to piezoelectric strips that provide power to the e-tattoos needed to amplify the received signals. The piezoelectric strips generate power by being physically compressed. In one or more embodiments, the piezoelectric strips are disposed at the joints of a user's body to generate power as the user moves compressing the piezoelectric strips. For example, piezoelectric strips can be positioned on a user's knees, elbows, ankles, wrists, or other areas of the body.

In one or more embodiments, the energy generated by the piezoelectric strips can be stored to supply power to the e-tattoos. In one or more embodiments, the generated energy can be stored by a capacitor. The stored energy can be used to supply power during periods where the piezoelectric strips are not being compressed and therefore not generating power, for example, when a user is at rest.

Also disposed on or implanted within the body are sensors that are capable of determining the signal strength of the signal transmitted through the path of the body area network. This information can be collected by the computing system to optimize and update the position of the devices 308 to ensure the reliability of the received signal at the destination device. In one or more embodiments, the system can recommend a different configuration of the devices 308 (e-tattoos). In an embodiment, the configuration and placement of the e-tattoos can be based on the activity type and the body type of the user. The activity type and body type can affect the communication path over the human body area network.

As body types for users vary, the configuration of the placement of e-tattoos will vary in order to achieve a desired signal strength as the signal is transmitted over the body. For example, a body type having a lean composition has different transmission properties when compared with a different body type. The presence/absence of joints can also affect signal loss.

Also, different activity types can determine the positioning of the devices and sensors disposed on or within the human body to achieve a desired signal strength. A user may exhibit movement in a normal or increased fashion. In another example, a user may exhibit no movement. For example, walking can be considered normal, while running is an increased fashion. A patient on bed rest may have no motion.

In addition, placement of the e-tattoo devices can depend on the specific type of athletic events. For example, tracking a cyclist may require different e-tattoo/piezoelectric strip placement than an event such as a tennis player which uses more upper body or hand motions. The optimal placement of e-tattoos for cyclists can be different than that for runners.

The factors discussed above are a non-exhaustive list. A cumulative and combination of factors are taken into consideration to determine the optimal placement for the e-tattoos.

Many factors are cumulative and the combination of factors must be considered as the most optimal placement is determined. Over a period of time data is collected and analyzed by the system to determine the different scenarios and combinations based on previous usages. For each instance of product usage, information regarding the individual person, body type and statistics, the type of event being tracked, placement and size of e-tattoo devices throughout the user's body, and measurable signal boost effect can be stored. In addition, the signal strength associated with each configuration can be stored and an indicator can be stored to indicate a satisfactory configuration, where the signal transmitted between each device is above a signal strength threshold.

In one or more embodiments, the effect of the signal boost through the body can be a percentage based on the improved performance of an added e-tattoo or modified configuration that is used to amplify the signal. The signal boost of each placed e-tattoo can be determined in pairs (e-tattoo location/percentage of boost). As more and more data is collected the measurable signal boost can be tracked and the data will merge upon an optimal configuration for the various configurations. This data can be stored in a knowledge base that can be leveraged by the system to predict future configurations for users exhibiting various combinations of activity types and body types.

The knowledge base can be sortable by various factors and/or by a combination of factors. These factors include body type, activity, gender, fitness level, etc. For example, the computing system can perform a search of the knowledge base for a specific an athletic body type for a female cyclist, where the results can be returned accordingly to provide a recommended configuration for the e-tattoos. The knowledge base can be sorted by any single factor or a combination of factors. Based on the knowledge base, a prediction can be made based on the activity time and the body type of the user. Based on the historical data a systematic recommendation can be provided in real time as signals and signal loss is detected.

FIG. 4 is a flow diagram for a method 400 for signal strength boosting in a human-body near-field communication system is shown. Block 402 includes receiving a configuration of a set of devices disposed on a body of a user for transmitting a signal a signal across the body of the user, the devices being configured to amplify the signal. In one or more embodiments, the devices are electronic tattoos including amplifying circuits for amplifying a received signal. In an embodiment, the power supplied to the amplifying circuits of the e-tattoos is generated by piezoelectric strips. The piezoelectric strips are placed on the joints of the user to generate power as the user moves and compress the piezoelectric strips.

Block 404 includes receiving an indication of a signal strength of the signal transmitted through each device of the set of devices. In one or more embodiments, multiple sensors can be positioned on a user to detect and measure the signal strength between the e-tattoos. This information can be transmitted and collected by a computing system for analysis.

Block 406 includes identifying a location of a signal loss based on the signal strength. In one or more embodiments, the computing system can determine where a signal loss has occurred based on historical data or based on differences in the expected performance. In one or more embodiments, an indication is transmitted to the computing system from the receiving device.

Block 408 includes providing a recommendation to modify the configuration of the set of devices based on the identified location of signal loss, wherein the recommendation provides a location for placement of one or more additional devices to increase the signal strength. For example, if a weak signal is detected an area of the human body, the computing system can identify the location and simulate the addition of an e-tattoo to amplify the signal. Based on the simulation, the computing system can provide a recommendation on a location to add or re-position an e-tattoo on the user's body to achieve an optimal signal strength through the path of the body area network. In one or more embodiments, the optimal signal strength may be determined by a configurable threshold. In another embodiment, the configurable threshold can be based on the receiving capabilities of the destination devices.

Block 410 includes updating the configuration based on the one or more additional devices. In one or more embodiments, the updated configurations can be stored in a database, knowledge base, or memory for future references. The configuration can include the positions of the e-tattoos, overall signal performance, signal strength, and other related information. In another embodiment, the activity type can be stored in combination with the configuration, signal strength, and performance information. In one or more embodiments, the one or more elements of the stored information can be used to predict a configuration for the positioning of the devices. In another embodiment, a user profile can be used to determine a configuration for the e-tattoos.

FIG. 5 is a flow diagram for a method 500 for signal strength boosting in a human-body near-field communication system is provided. Block 502 provides determining a profile of the user.

Block 504 includes predicting a configuration based on the profile, where the prediction is based on historical data for other users and events having a similar profile. In one or more embodiments, the user profiles includes a configuration of the devices such as the location of each sensor on the user's body, the body type of the user, and the event type the user is performing.

Block 506 provides reanalyzing signal strength of the predicted configuration. After the configuration of devices is set to a configuration based on the predicted configuration, the signal strength is reanalyzed to determine the sufficiency. At block 508, the method 500 includes updating the profile based on the analysis of the signal strength of the subsequent signal. In one or more embodiments, a database or knowledge based storing the different configurations is updated indicating the performance of the configuration and signal strength of the signal received at the destination receiver.

In the event target receiving devices are not receiving a strong enough signal with sufficient strength through the body area network, the computing system can provide a notification to a user's device through a connection, such as Wi-Fi or Bluetooth. In one or more embodiments, the notification can include a recommendation of a location to add an e-tattoo based on locating the joints that are closest to the spot of the identified signal loss.

The techniques provided describe the placement of e-tattoo based signal boosters at different joint locations. When the user moves, joints are primarily moved, and this will create a bending stress on the piezoelectric strips that are coupled to the e-tattoos. Accordingly, power will be generated and used for receiving, amplifying and re-transmitting signals through the human body near field communication system. This ensures the integrity of the signal at the receiving end for processing.

The e-tattoos and associated piezoelectric strips generate power and boost body area network performance through a simple joint bending action. The body area network will be able to provide statistics and determine the locations of the system that are weak and recommend the locations and positions to add more e-tattoos to increase the signal strength. As more data is collected and aggregated by the system a self-learning process to determine a recommended device placement is executed. The techniques described provide various applications that require multiple sensors to constantly communicate while ensuring the transmitted signals are sufficiently strong.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for signal strength boosting in a human-body near-field communication systems, the method comprising:
   receiving a configuration of a set of devices disposed on a body of a user for transmitting a signal across the body of the user, the devices being configured to amplify the signal;
   receiving an indication of a signal strength of the signal transmitted through each of the set of devices;
   identifying, by a processor, a location of signal loss based on the signal strength;
   providing a recommendation to modify the configuration of the set of devices based on the identified location of signal loss, wherein the recommendation provides a location for placement of one or more additional devices to increase the signal strength;
   updating the configuration based on the one or more additional devices;
   storing the configuration of the set of devices, an associated body type and event type, wherein the configuration of the set of devices includes a location of each device of the set of devices, wherein the event type is an athletic activity, wherein the athletic activity determines a placement of the location of each device of the set of devices;
   storing a signal strength for each configuration; and
   utilizing an indicator for a satisfactory configuration indicating the signal transmitted between each device is above a signal strength threshold.

2. The computer-implemented method of claim 1, further comprising receiving a user profile; and
   providing an initial configuration of the set of devices based on the user profile.

3. The computer-implemented method of claim 1, further comprising predicting the configuration of the set of devices based on a user body type and event type, wherein the prediction is based on historical data of other users;
   analyzing signal strength of a subsequent signal transmitted through the body of the user with the predicted configuration; and
   updating a stored user profile based on the analysis of the subsequent signal.

4. The computer-implemented method of claim 1, wherein the signal is transmitted through a body area network using one or more electronic-tattoos to amplify the signals, wherein a source of power for the electronic-tattoos to amplify the signals include piezoelectric strips disposed at joints of the body of the user.

5. The computer-implemented method of claim 1, wherein the modification comprises at least one of reconfiguring devices in the set of devices and adding one or more devices on the body where the signal loss is identified.

6. The computer-implemented method of claim 1, updating a user profile based on a current signal performance and recommending a configuration of devices based on the current signal performance; and
   updating the user profile.

7. A system for signal strength boosting in a human-body near-field communication systems, the system comprising:
   a storage medium, the storage medium being coupled to a processor;
   the processor configured to:
      receive a configuration of a set of devices disposed on a body of a user for transmitting a signal across the body of the user, the devices being configured to amplify the signal;
      receive an indication of a signal strength of the signal transmitted through the of the set of devices;
      identify a location of signal loss based on the signal strength;
      provide a recommendation to modify the configuration of the set of devices based on the identified location of signal loss, wherein the recommendation provides a location for placement of one or more additional devices to increase the signal strength;
      update the configuration based on the one or more additional devices; and
      store the configuration of the set of devices, an associated body type and event type, wherein the configuration of the set of devices includes a location of each device of the set of devices, wherein the event type is an athletic activity, wherein the athletic activity determines a placement of the location of each device of the set of devices.

8. The system of claim 7, wherein the processor is further configured to receive a user profile; and
   provide an initial configuration of the set of devices based on the user profile.

9. The system of claim 7, wherein the processor is further configured to predict the configuration of the set of devices based on a user body type and event type, wherein the prediction is based on historical data of other users;
   analyze signal strength of a subsequent signal transmitted through the body of the user with the predicted configuration; and
   update a stored user profile based on the analysis of the subsequent signal.

10. The system of claim 7, wherein the signal is transmitted through a body area network using one or more electronic-tattoos to amplify the signals, and wherein a source of power for the electronic-tattoos to amplify the signals include piezoelectric strips disposed at joints of the body of the user.

11. The system of claim 7, wherein the modification comprises at least one of reconfiguring devices in the set of devices and adding one or more devices on the body where the signal loss is detected.

12. The system of claim 7, wherein the processor is further configured to update a user profile based on a current signal performance and recommend a configuration of devices based on the current signal performance; and
updating the user profile.

13. The system of claim 7, wherein the processor is further configured to store configuration of the set of devices, an associated body type and activity type for the user;
store a signal strength for each configuration; and
utilize an indicator for a satisfactory configuration indicating the signal transmitted between each device is above a signal strength threshold.

14. A computer program product for signal strength boosting in a human-body near-field communication systems, the computer program product comprising:
a computer readable storage medium having stored thereon first program instructions executable by a processor to cause the processor to:
receive a configuration of a set of devices disposed on a body of a user for transmitting a signal across the body of the user, the devices being configured to amplify the signal;
receive an indication of a signal strength of the signal transmitted through each of the set of devices;
identify a location of signal loss based on the signal strength;
provide a recommendation to modify the configuration of the set of devices based on the identified location of signal loss, wherein the recommendation provides a location for placement of one or more additional devices to increase the signal strength;
update the configuration based on the one or more additional devices; and
store the configuration of the set of devices, an associated body type and event type, wherein the configuration of the set of devices includes a location of each device of the set of devices, wherein the event type is an athletic activity, wherein the athletic activity determines a placement of the location of each device of the set of devices.

15. The computer program product of claim 14, wherein the instructions are further executable by the processor to cause the processor to receive a user profile; and
provide an initial configuration of the set of devices based on the user profile.

16. The computer program product of claim 14, wherein the instructions are further executable by the processor to cause the processor to predict the configuration of the set of devices based on a user body type and event type, wherein the prediction is based on historical data of other users;
analyze signal strength of a subsequent signal transmitted through the body of the user with the predicted configuration; and
update a stored user profile based on the analysis of the subsequent signal.

17. The computer program product of claim 14, wherein the signal is transmitted through a body area network using one or more electronic-tattoos to amplify the signals, wherein a source of power for the electronic-tattoos to amplify the signals include piezoelectric strips disposed at joints of the body of the user.

18. The computer program product of claim 14, wherein the modification comprises at least one of reconfiguring devices in the set of devices and adding one or more devices on the body where the signal loss is detected.

19. The computer program product of claim 14, wherein the instructions are further executable by the processor to cause the processor to update a user profile based on a current signal performance and recommend a configuration of devices based on the current signal performance; and
update the user profile.

* * * * *